United States Patent [19]

Brennan

[11] 4,020,013

[45] Apr. 26, 1977

[54] CATALYTIC COMPOSITE FOR TREATING EXHAUST GASES FROM AN INTERNAL COMBUSTION ENGINE

[75] Inventor: John F. Brennan, Des Plaines, Ill.

[73] Assignee: UOP Inc., Des Plaines, Ill.

[22] Filed: Oct. 20, 1975

[21] Appl. No.: 624,210

[52] U.S. Cl. .................... 252/466 PT; 252/472; 423/213.5

[51] Int. Cl.² .................. B01J 21/04; B01J 23/42; B01J 23/46

[58] Field of Search ............. 252/466 PT, 472; 423/213.5

[56] References Cited

UNITED STATES PATENTS

| | | | |
|---|---|---|---|
| 3,784,675 | 1/1974 | Kobylinski et al. | 423/213.5 |
| 3,840,389 | 10/1974 | Kobylinski et al. | 252/466 PT |
| 3,895,093 | 7/1975 | Weidenbach et al. | 252/466 PT |
| 3,909,456 | 9/1975 | Numagami et al. | 252/472 |

*Primary Examiner*—W. J. Shine
*Attorney, Agent, or Firm*—James R. Hoatson, Jr.; Robert W. Welch; William H. Page, II

[57] ABSTRACT

A catalytic composite of a high surface area refractory inorganic oxide containing rhodium and ruthenium impregnated thereon in a weight ratio of from about 1:1 to about 2:1, said rhodium comprising from about 0.02 to about 0.10 wt. % of said catalytic composite. The catalytic composite is particularly useful in the treatment of exhaust gases to convert nitrogen oxides to nitrogen.

4 Claims, No Drawings

CATALYTIC COMPOSITE FOR TREATING EXHAUST GASES FROM AN INTERNAL COMBUSTION ENGINE

Gaseous waste products resulting from the burning or combustion of hydrocarbonaceous fuels, such as gasoline and fuel oils, comprise carbon monoxide, hydrocarbons and oxides of nitrogen as products of combustion or incomplete combustion. While exhaust gases from other hydrocarbonaceous fuel burning sources such as stationary engines, industrial furnaces, etc., contribute substantially to pollution of the atmosphere, the exhaust gases of automotive engines are a major source of pollution. Of the various methods which have been proposed for controlling the pollutants discharged to the atmosphere from automotive engines, the incorporation of a catalytic converter in the exhaust system holds the most promise of meeting the increasingly rigid standards established by the responsible governmental agencies.

This invention relates to a novel catalytic composite useful in the treatment of hot exhaust gases from an internal combustion engine for the conversion of nitrogen oxides contained therein. Removal of nitrogen oxides, which reportedly form ozone in the presence of sunlight and react with hydrocarbon pollutants of the atmosphere to form noxious products, has proven to be a much more difficult problem than was first anticipated. While certain of the prior art exhaust gas conversion catalysts, notably platinum and/or palladium, are effective catalysts for the conversion of nitrogen oxides under conditions of relatively rich engine operation, appreciable amounts of ammonia are formed in the process. Ammonia is not only a pollutant per se, but is reoxidized back to nitrogen oxides when, as will normally be the case, the exhaust gases are continued through a second stage catalytic converter designed to oxidize carbon monoxide and unburned hydrocarbons prior to discharge to the atmosphere.

It is an object of this invention to present a novel catalytic composite for use in the treatment of hot exhaust gases from an internal combustion engine, said catalytic composite being particularly useful to convert nitrogen oxides to nitrogen.

In one of its broad aspects, the present invention embodies a catalytic composite suitable for use in the treatment of hot exhaust gases from an internal combustion engine to convert nitrogen oxides to nitrogen, said composite comprising from about 0.02 to about 0.10 wt. % rhodium impregnated on a high surface area refractory inorganic oxide in from about a 1:1 to about 2:1 weight ratio with ruthenium.

Another embodiment of the present invention relates to a catalytic composite substantially as described and further comprising platinum in from about a 1:1 to about an 8:1 weight ratio with said rhodium.

One of the more specific embodiments of this invention concerns a catalytic composite suitable for use in the treatment of hot exhaust gases from an internal combustion engine to convert nitrogen oxides to nitrogen, said composite comprising from about 0.01 to about 0.10 wt. % rhodium impregnated on gamma-alumina in about a 2:1 weight ratio with ruthenium, said composite further comprising platinum in from about a 1:1 to about an 8:1 weight ratio with said rhodium.

Other objects and embodiments of this invention will become apparent in the following detailed specification.

The refractory, high surface area component of the catalytic composite of this invention serves as a carrier material for the other components of the composite and includes the naturally occurring clays and silicates commonly employed as a carrier material for catalytic components. For example, the refractory, high surface area material may comprise fuller's earth, Attapulgus clay, feldspar, halloysite, montmorillonite, kaolin, and diatomaceous earth — variously referred to as siliceous earth, diatomaceous silicate, kieselguhr, and the like; and the naturally occurring material may or may not be activated prior to use by one or more treatments including drying, calcining, steaming and/or acid treatment. Synthetically prepared refractory inorganic oxides like alumina, silica, zirconia, boria, thoria, magnesia, titania, chromia, etc., or composites thereof, particularly alumina in combination with one or more refractory inorganic oxides, for example, alumina-silica, alumina-zirconia, alumina-chromia and the like, and having a total surface area of from about 25 to about 600 m$^2$/gm, are especially suitable. In some cases, the refractory inorganic oxide may also exhibit a catalytic effect alone or in combination with the other components of the catalytic composite. In this and other respects, alumina is a preferred refractory inorganic oxide, and the alumina may be any of the various hydrous aluminum oxides or alumina gels such as boehmite, gibbsite, bayerite, and the like. Activated aluminas, such as have been thermally treated at a temperature in excess of about 400° C. with the elimination of at least a portion of the chemically and/or physically combined water and hydroxyl groups commonly associated therewith, are particularly suitable. Preferably, the alumina is an activated alumina with a surface area of from about 25 to about 500 m$^2$/gm, especially gamma-alumina and eta-alumina resulting from the thermal treatment of boehmite alumina and bayerite alumina respectively, generally at a temperature of from about 400° to about 850° C. The alumina may be employed in any suitable shape or form including spheres, pills, extrudates, granules, cakes, briquettes, rings, etc., and particularly low density spheres such as are continuously manufactured by the oil-drop method described in detail in U.S. Pat. No. 2,620,314.

The catalytic composite of this invention further comprises rhodium and ruthenium impregnated on said high surface area support or carrier material. While ruthenium has heretofore been recognized as effective to convert nitrogen oxides to nitrogen, it has now been found that rhodium in combination with ruthenium in a weight ratio of from about 1:1 to about 2:1 works a substantial improvement on said conversion, provided said rhodium comprises from about 0.02 to about 0.1 wt. % of said catalytic composite.

The rhodium component may be impregnated on the high surface area carrier material by conventional methods which generally entail soaking, dipping one or more times, or otherwise immersing the carrier material in an aqueous solution of a decomposable rhodium compound, preferably an aqueous rhodium trichloride solution. The resulting composite is subsequently oxidized, suitably in air at a temperature of from about 370° to about 650° C., and/or reduced, suitably in hydrogen at a temperature in the 370°–650° C. range. The ruthenium component is preferably impregnated on the carrier material from a common impregnating solution, for example, rhodium trichloride in a common aqueous solution with ruthenium trichloride, each in sufficient concentration to yield a final calcined catalytic composite containing from about 0.02 to about 0.10 wt. % rhodium in the stated weight ratio with ruthenium.

In one preferred embodiment of this invention, the described catalytic composite further comprises platinum in a weight ratio of from about 1:1 to about 8:1 with the rhodium component. It has been observed that the platinum component effects a substantial activity improvement with respect to the conversion of nitrogen oxides, and said improvement is without the sacrifice of the selectivity improvement exhibited by the rhodium-ruthenium combination with respect to the conversion of said nitrogen oxides to nitrogen, provided that the platinum is employed in the stated weight ratio. In any case, the resulting composite is subsequently oxidized, suitably in air, at a temperature of from about 370° to about 650° C., and/or reduced, suitably in hydrogen, at a temperature in the 370°–650° C. range.

The catalytic composite of this invention is suitable for use in a converter or a reactor of through-flow, cross-flow, or radial-flow design installed in the exhaust line of an internal combustion engine. The converter or reactor may be employed in series with a subsequent oxidation converter or reactor with combustion air being injected ahead of the oxidation converter to insure conversion of the residual carbon monoxide and hydrocarbons remaining in the exhaust gases.

The following examples are presented in illustration of the improved conversion of nitrogen oxides to nitrogen derived from the use of the catalytic composite of this invention, and said examples are not intended as an undue limitation on the generally broad scope of the invention as set out in the appended claims.

EXAMPLE I

About 100 cubic centimeters of ⅛ inches gamma-alumina spheres with a surface area of about 125 square meters per gram and an average bulk density of 0.3 grams per cubic centimeter were immersed in a 100 cubic centimeter aqueous solution of ruthenium and rhodium chlorides in a rotary steam dryer. The solution was then evaporated to dryness in contact with the tumbling spheres. The resulting impregnated spheres were subsequently calcined in air at 425° C. to yield a catalytic composite consisting of alumina with 0.01 wt. % rhodium and 0.01 wt. % ruthenium impregnated thereon. The catalytic composite is hereinafter referred to as Catalyst A. A Catalyst B was prepared substantially as described except that the finished catalytic composite contained 0.02 wt. % rhodium and 0.01 wt. % ruthenium.

EXAMPLE II

Catalyst C was prepared substantially as described in Example I except that the impregnating solution was a common solution of ruthenium and rhodium chlorides and chloroplatinic acid, and the resulting catalytic composite contained 0.01 wt. % rhodium, 0.01 wt. % ruthenium, and 0.08 wt. % platinum. A Catalyst D was similarly prepared except that the finished catalytic composite contained 0.02 wt. % rhodium, 0.01 wt. % ruthenium and 0.02 wt. % platinum.

Table I below shows further catalytic composites E through K prepared substantially as described with respect to Catalysts C and D and containing various quantities of ruthenium, rhodium and platinum in various weight ratios as indicated.

TABLE I

| Catalyst | % Ru | % Rh | % Pt | NO→$N_2$ | 50% Conv., ° C. |
|---|---|---|---|---|---|
| A | .01 | .01 | — | 67 | 302 |
| B | .01 | .02 | — | 70 | 285 |
| C | .01 | .01 | .08 | 45 | 288 |
| D | .01 | .02 | .02 | 65 | 282 |
| E | .01 | .02 | .08 | 68 | 280 |
| F | .01 | .02 | .16 | 62 | 278 |
| G | .04 | .08 | .08 | 68 | 251 |
| H | .01 | .08 | .08 | 22 | 254 |
| I | .02 | .02 | .16 | 71 | 279 |
| J | .01 | .01 | .16 | 41 | 288 |
| K | .04 | .04 | .64 | 40 | 272 |

The tabulated results demonstrate the criticality of the weight percent rhodium limitation of this invention with or without a platinum component added to the catalytic composite. In the former case (Catalyst C) the selectivity suffers dramatically, while in the latter case (Catalyst A) there is a substantial activity loss. When, as in the case of Catalyst J and K, the platinum to rhodium weight ratio is in excess of about 8:1, the selectivity is again dramatically adversely affected, and essentially the same result occurs when, as in Catalyst H, the rhodium to ruthenium weight ratio is in excess of about 2:1, offsetting a substantial activity gain.

I claim as my invention:

1. A catalytic composite suitable for use in the treatment of exhaust gases from an internal combustion engine to convert nitrogen oxides to nitrogen, said composite consisting of ruthenium, platinum and from about 0.02 to about 0.10 wt. % rhodium deposited on a high surface area refractory inorganic oxide carrier wherein the weight ratio of rhodium to ruthenium is from about 1:1 to about 2:1 and wherein said platinum is in from about a 1:1 to about 8:1 weight ratio with said rhodium.

2. The catalytic composite of claim 1 further characterized in that said rhodium is deposited on said refractory inorganic oxide carrier in about a 2:1 weight ratio with said ruthenium.

3. The catalytic composite of claim 1 further characterized in that said refractory inorganic oxide is alumina.

4. The catalytic composite of claim 1 further characterized in that said refractory inorganic oxide is alumina having a surface area of from about 25 to about 500 m²/gm.

* * * * *